United States Patent [19]

Sharpe

[11] 4,140,192

[45] Feb. 20, 1979

[54] WHEELCHAIRS

[75] Inventor: John W. Sharpe, La Mesa, Calif.

[73] Assignee: The Spastics Society, London, England

[21] Appl. No.: 847,796

[22] Filed: Nov. 2, 1977

[51] Int. Cl.[2] .............................. B62D 11/04

[52] U.S. Cl. .............................. 180/6.5; 180/68.5; 180/DIG. 3; 224/42.45 R

[58] Field of Search .............. 180/68.5, 6.5, DIG. 3; 280/DIG. 10; 248/503, 354 R, 352; 211/86; 224/42.45 R, 42.42 R, 29 R; 312/245; 108/106

[56] References Cited

U.S. PATENT DOCUMENTS

| | | | |
|---|---|---|---|
| 1,338,690 | 5/1920 | Moorman | 180/68.5 |
| 2,637,474 | 5/1953 | Vincenzo | 224/42.45 R |
| 3,037,570 | 6/1962 | Olson | 180/6.5 |
| 3,955,639 | 5/1976 | Cragg | 180/6.5 |
| 4,067,409 | 1/1978 | DiMatteo | 180/DIG. 3 |

*Primary Examiner*—Joseph F. Peters, Jr.
*Assistant Examiner*—R. Schrecengost
*Attorney, Agent, or Firm*—Wender, Murase & White

[57] ABSTRACT

An improved wheelchair having electrically powered drive motors in which a battery support tray is secured within an opening in a side frame of the wheelchair. Two batteries can be supported, one on each side frame, whereupon the conventional undercarriage battery support rack may be eliminated. Each side frame of the wheelchair contains a drive motor and battery support tray and forms a self-contained assembly such that left and right hand side assemblies can be joined together by foldable links having any desired length to provide a correspondingly desired seat width.

12 Claims, 3 Drawing Figures

FIG. 2
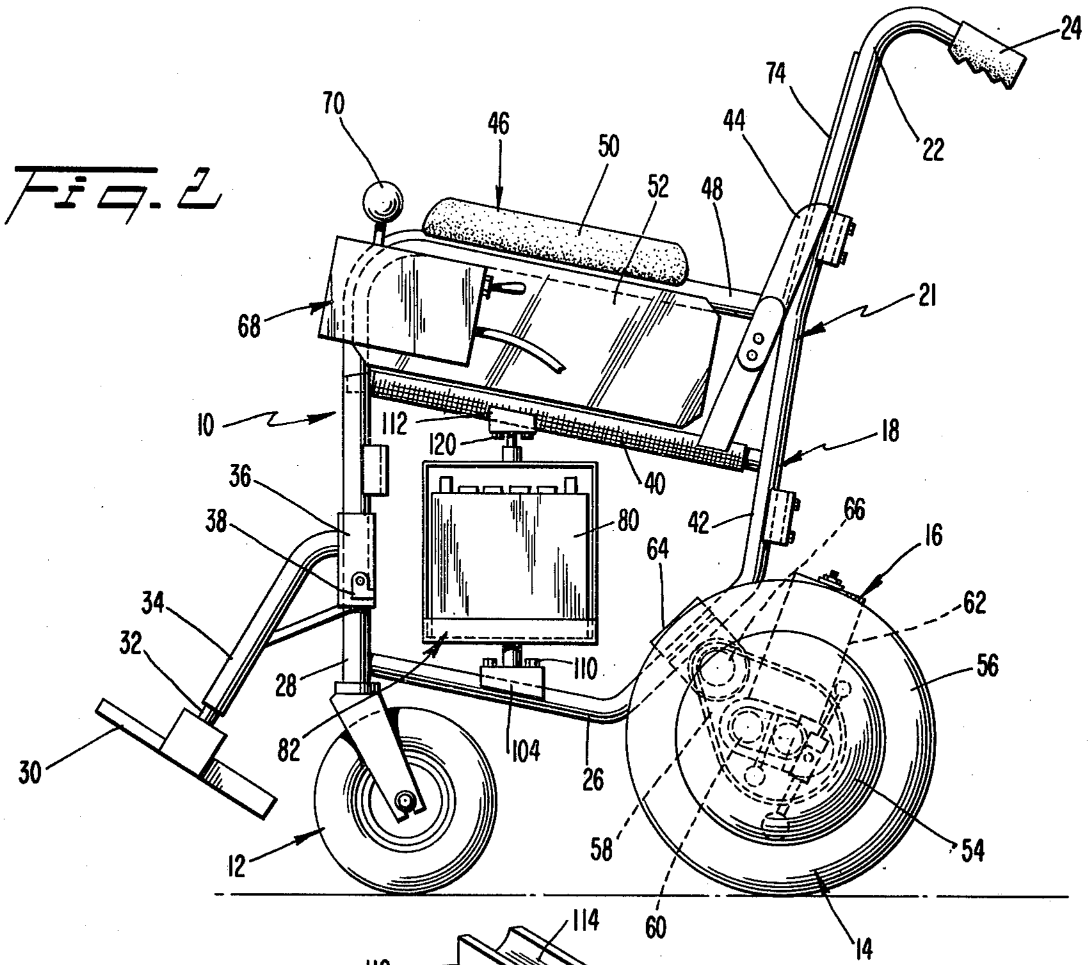
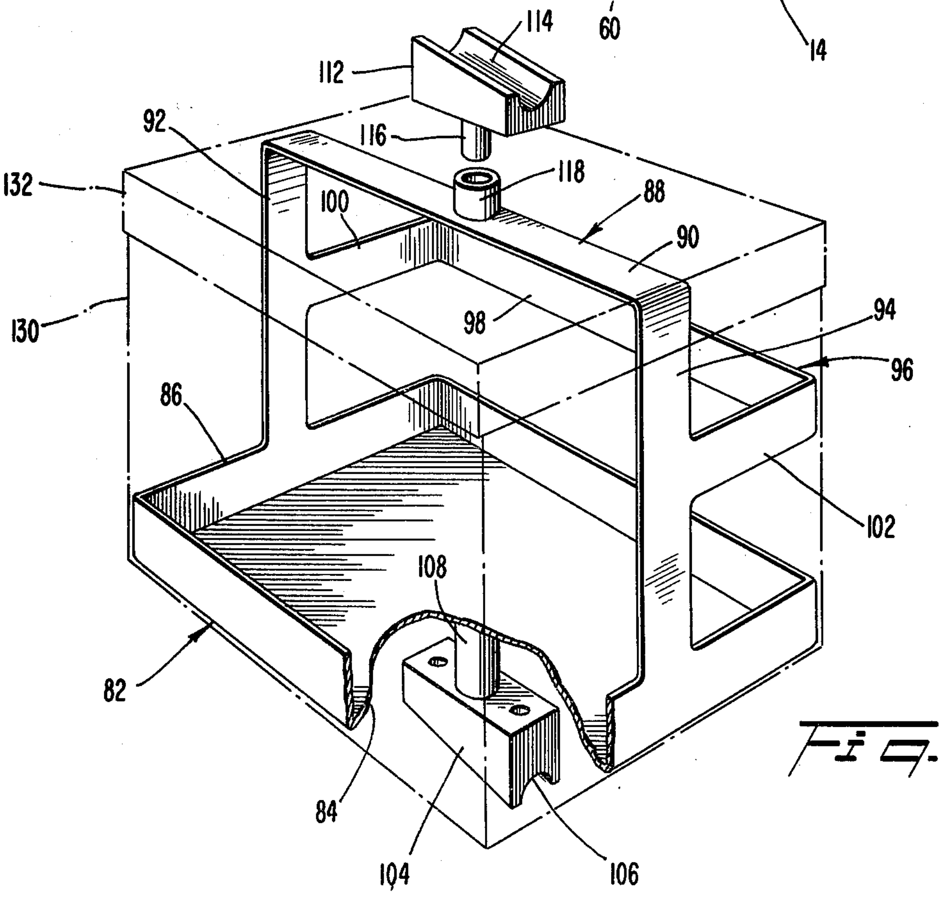
FIG. 3

WHEELCHAIRS

BACKGROUND OF THE INVENTION

1. Field of the Invention

The present invention is concerned with improvements in or relating to wheelchairs, and in particular, to battery support trays suitable for a wheelchair, as well as wheelchairs embodying battery support trays.

2. Description of the Prior Art

Conventional electrically driven wheelchairs normally carry one or two automobile-type wet cell batteries on a rigid tray which is mounted underneath the seat panel. In some instances, the batteries are supported directly on the tray, and the tray can be removed from the mounts on which it is seated so that the battery and tray assembly can be removed at one time. In other cases, the tray is fixedly secured to the wheelchair frame, and the batteries have to be removed from the tray before the tray assembly can be disassembled. In assemblies of this latter type, the batteries are typically enclosed in a carrier which is provided with handles.

In either of these prior known arrangements, the batteries have to be removed before the wheelchair can be folded. Thus, even if the basic wheelchair design is of the conventional, folding type, the provision of a battery tray extending between the side frames defeats the folding feature and requires that a complicated procedure be followed whenever one intends to store or transport the wheelchair.

In addition to the above noted disadvantage, prior art electrically driven wheelchairs exhibit several other shortcomings resulting directly from the mounting of the batteries on a tray underneath the seat. One of these drawbacks is the fact that the manufacture of wheelchairs of differing widths requires that different sized mounting trays be provided for the support of the batteries. Another shortcoming is that the low mounting of the batteries, which are generally quite heavy, makes it very difficult to remove or replace batteries whenever a battery wears out or whenever it is desired to fold the chair.

SUMMARY OF THE INVENTION

It is, therefore, an object of the present invention to mount the storage batteries of an electric wheelchair on the side frames of the chair.

This invention has another object in the design and construction of an electrically driven wheelchair which can be folded for storage or transportation without requiring removal of the batteries.

A further object of this invention is to construct a battery support frame in the form of a carrier which can be removably attached to an opening in a side frame of an electrically driven wheelchair.

According to the present invention, an embodiment of a battery assembly for a wheelchair having first and second side frame assemblies connected by foldable lengths, a set of wheels mounted on the side frame assemblies, and electric drive motors coupled to the wheels, includes a flat, generally rectangular support tray having an upwardly directed peripheral flange for receiving a battery, a rigid carrier strap attached to the support tray, a first mounting assembly on the support tray for attaching the tray to a frame member of one of the side frame assemblies of the wheelchair, and a second mounting mechanism on the rigid carrier strap for attaching the strap to another frame member of the same side frame assembly, whereby the battery may be carried solely on one of the side frame assemblies to enable folding of the wheelchair without requiring battery removal.

The present invention also provides for the construction of wheelchairs embodying such battery assemblies.

The present invention exhibits several distinct advantages over the prior art. By supporting the batteries on the side frame assemblies only, the wheelchair may be folded for storage or transportation without requiring that the batteries be disconnected and removed. The side placement of the batteries is also advantageous in that it enables the batteries to be replaced or serviced with relative ease compared with the difficulty of removing heavy batteries from directly underneath the wheelchair seat. Another advantage of the present invention is that the bottom of the wheelchair is left available for attachment of a parcel shelf which can be used for several purposes including the support of a battery charger. By allowing mounting of a battery charger permanently under the wheelchair seat, the batteries can be recharged whenever the wheelchair occupant is at a stationary position, such as behind a desk, for any length of time. In this manner, battery life can be extended by preventing the batteries from nearly completely discharging between charge cycles.

The present invention has another, significant advantage which renders the design and construction of a full line of wheelchairs considerably less expensive and less complicated than wheelchairs presently on the market. By facilitating the mounting of the batteries on each of the side frame assemblies of the wheelchair, the side frame assemblies in effect become self-contained or integral units which need be connected only by foldable links and the flexible seat and back panels to produce a complete wheelchair. Thus, wheelchairs of any desired width can be easily constructed using identical, prefabricated side assemblies which are connected together by foldable links and flexible panels of appropriate dimensions. In this manner, a wheelchair manufacturer can mass produce left and right-hand side frame assemblies which can be used, without modification, for wheelchairs intended for use by both children and adults.

Other objects and advantages of the present invention will become apparent from the following description of a preferred embodiment when taken in conjunction with the accompanying drawings.

BRIEF DESCRIPTION OF THE DRAWING

FIG. 2 is a side elevational view of the wheelchair of FIG. 1; and

FIG. 3 is a perspective view, with parts broken away, of the battery support assembly of the present invention.

DESCRIPTION OF THE PREFERRED EMBODIMENT

Figure 1:
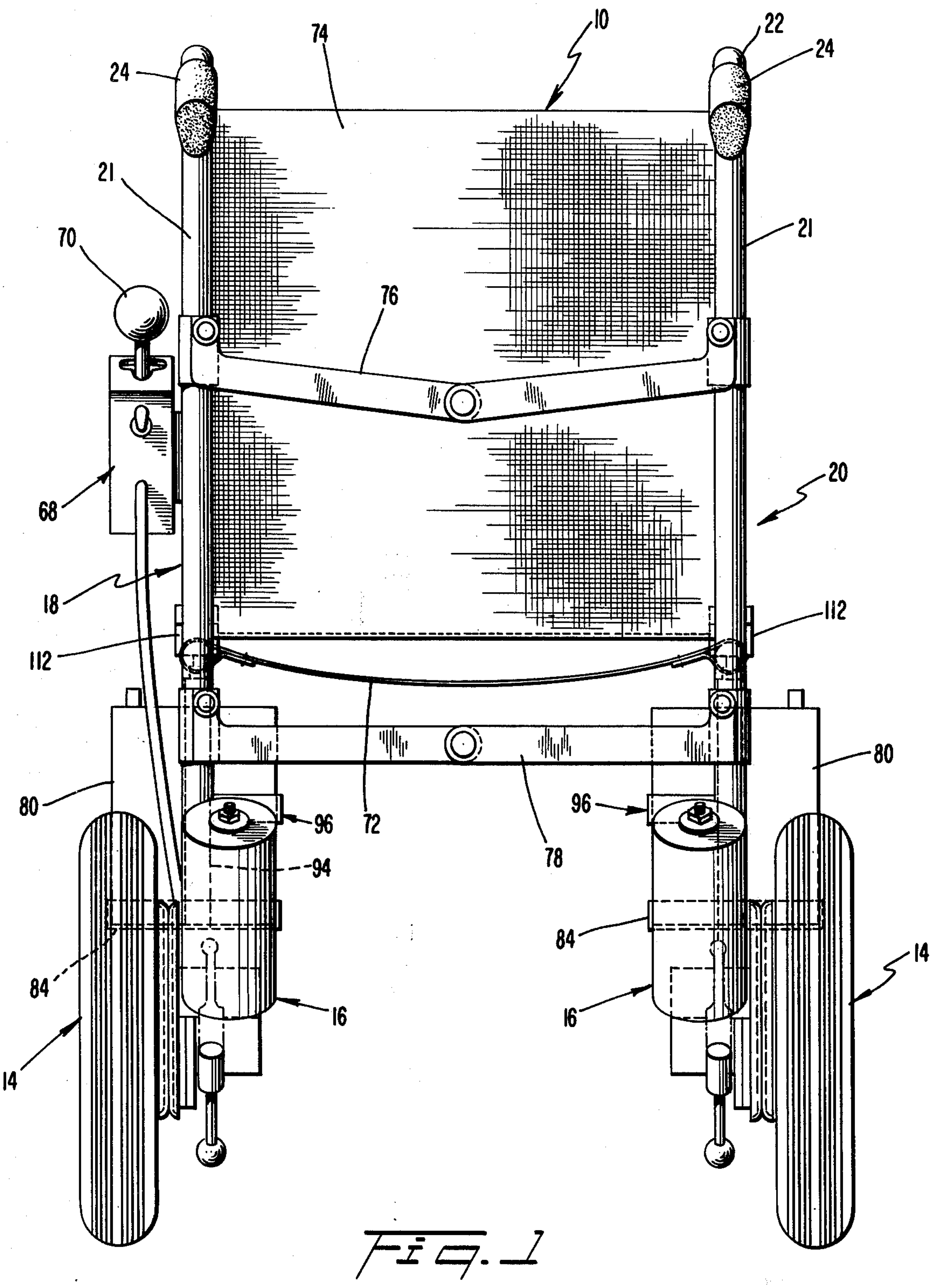
FIG. 1 is a rear elevational view of a preferred embodiment of a wheelchair in accordance with the present invention.

Referring to FIGS. 1 and 2 of the accompanying drawings, the present invention is embodied in a wheelchair 10 having a tubular, foldable frame made principally of light alloy supported on a pair of front caster wheels 12 and a pair of rear wheels 14 driven by electric drive motor assemblies 16.

The frame comprises two main side assemblies 18 and 20 each having a main frame member 21 of substantially L-shape having a rearwardly inclined upper handle portion 22 covered by a hand-grip 24 by means of which the wheelchair may be propelled manually. Each of the generally L-shaped members 21 has a bottom portion 26 which is rigidly connected to the lower end of one of two substantially vertical front members 28. Each of the caster wheels 12 is mounted on the end of an associated one of the two front members 28. In addition to the caster wheels, each of the front members 28 detachably carries a foot rest 30 which is mounted on a stem 32 adjustably received within one end of a foot rest hanger 34, the other end of the hanger being connected to a channel-shaped bracket 36 which embraces the front member 28 and is releasably locked thereto by a pin and slot connection 38.

Each of two substantially horizontal seat support members 40 is fixed between the upper end of a respective one of the front members 28 and an upright portion 42 of its associated main frame member 21 so that the seat support members are slightly downwardly and rearwardly inclined and are parallel to the bottom portions 26, as shown in FIG. 2. Each seat support member 40 is also connected to the upright portion 42 of the associated main frame member 21 by a strut or link 44. In addition, one of a pair of detachable arm rests 46 releasably engages the strut 44 and a mounting, such as a socket, provided on the upper end of the associated front member 28. The arm rest 46 comprises a tubular L-shaped element 48 carrying an elongated cushion 50 and a modesty panel 52.

Each rear wheel 14 includes an annular rim 54 supporting a tire 56 which is preferably of the pneumatic type. The rim 54 is rotatably mounted on an egg-shaped plate 58 and is driven through a suitable gear transmission assembly 60 by a drive motor 62. The narrow end of plate 58 is attached to a suitable mounting bracket 64 by a resilient rubber bushing 66. In this manner, the resiliently mounted plate 58 provides proper support for carrying the wheel 14 while permitting limited resilient springing movement of the wheel relative to the wheelchair frame.

The electric motors 62 of each of the rear wheel assemblies 14 are connected to receive operating potential through a manually operable progressive control unit 68. Such control unit may be of any suitable known kind whereby a control handle 70 may be manipulated from a neutral control stop position to a forward or rearward position with the distance of the movement of the handle being proportional to the power output to the motor for speed control thereof. The control handle 70 also may be moved to one side or the other to control turning movement. Such steering control is provided in the wheelchair according to the present invention by the independent supply of operating potential to each of the two drive motors 62. When the control handle 70 is moved completely to one side, for example, one of the motors will be energized to operate in the forward direction while the other motor operates in the reverse direction. The wheelchair is thus caused to rotate in very small turning circles or arcs which are followed by the caster wheels 12 due to their inherent operation.

A seat panel 72 of a flexible material extends between the two seat support members 40 and a similar back rest panel 74 extends between the upright portions 42 of the two main members 21.

The upright members 42 of the two main frame members 21 of the side assemblies 18 and 20 are connected together by upper and lower hinged links 76, 78, and the two front members 28 are also connected by a hinged assembly including two pairs of links (not shown). Preferably, at least one of the links is arranged to maintain the wheelchair in the operative position (as shown) and to retain it against such folding movement when in use. This may be provided by a double link assembly in which the hinges permit the links to pivot to an over-center locked position; alternatively, an interlocking or manual fastening structure may be provided.

Each one of a pair of storage batteries 80 is carried upon a battery support assembly, indicated generally as 82, in accordance with the present invention. As best shown in FIGS. 2 and 3, the battery support assembly 82 includes a flat, generally rectangular support tray 84 having an upwardly directed peripheral flange 86 defining a recessed compartment of sufficient size to accommodate the necessary battery for powering the drive motor 62.

A rigid, inverted, generally U-shaped carrier strap 88 is attached to the support tray 84 through the intermediary of flange 86. The support strap 88 is preferably constructed of a suitable rigid material, such as a lightweight metal or plastic, and includes an elongated, flat main strap portion 90 aligned longitudinally with respect to the support tray 84 and lying in a plane in superposition of and parallel to the plane of the support tray. The carrier strap also includes a pair of generally flat leg portions 92 and 94 connecting the ends of the main strap portion 90 to respective opposite sides of the tray 84.

The battery assembly 82 also includes a generally U-shaped wall strap 96 having a back strap portion 98 connected at each end by a respective one of a pair of arms 100 and 102 to an intermediate point of the leg portions 92 and 94, respectively, of the carrier strap 88. As can be appreciated from FIG. 3, both the carrier strap 88 and the wall strap 96 may be formed of a flat, elongated length of material bent 90° at the corner points and joined in the manner shown to provide a generally rectangular box-like support frame into which the battery 80 may be received and carried.

While any number of configurations may be utilized to accommodate the shape of battery 80, it is preferred that the main strap 90 be located in a plane parallel to support tray 84 while leg 92 and arm 100, and leg 94 and arm 102 lie in respective parallel planes perpendicular to the planes of the support tray 84 and main strap 90. Back strap 98 preferably lies in yet another plane perpendicular to all of the aforementioned planes whereupon the generally rectangular dimensions of storage batteries designed for use in conjunction with electric wheelchairs may be readily accommodated.

It is preferred that a pair of batteries be provided in a pair of support assemblies 82, each support assembly being mounted on a respective one of the side frame assemblies 18 and 20. To this end, each battery support assembly 82 includes a lower mounting block 104, the bottom surface of which defines a longitudinal channel 106 for cooperation with the tubular lower member 26 of the side frame. The top of block 104 is connected rigidly to the center of the bottom of support tray 84 by a connecting link 108 of any suitable design. Mounting block 104 may be attached to the frame by appropriate fastening means, such as threaded bolts 110 (FIG. 2).

An upper mounting block 112 defines a groove 114 in a top surface for cooperation with side frame members 40. Extending from the bottom of mounting block 112 is a generally cylindrical connecting link 116 which is adapted to be slidably received within a hollow, cylindrical sleeve 118 which is rigidly attached to and extends upwardly from the carrier strap 88. Block 112 may be attached to the frame by any suitable means, such as threaded bolts 120 (FIG. 2), and the sliding motion of link 116 within sleeve 118 allows the battery assembly to be easily removed from the wheelchair, if desired.

As can be appreciated from FIG. 2, the outer faces of mounting blocks 104 and 112 are inclined slightly such that the support tray 84 is nearly horizontal despite the fact that the mounting frame members 26 and 40 are slightly inclined. To accommodate variations in inclination, and to make the mounting assemblies universally adaptable, the connecting links 108 and 116 may be connected to the respective mounting blocks 104 and 112 by means of a suitable pivot.

Referring to FIG. 2, it can be appreciated that frame members 26, 28, 40 and 42 of each of the side frame assemblies 18 and 20 define an enclosed space within which the battery 80 and battery support assembly 82 are mounted. In this position, the battery 80 is readily accessible and can be connected to the control 68 with very little risk of short circuits or other electrical problems. The position of the battery also allows a charger unit to be connected with ease and permits the battery to be conveniently replaced. As shown in FIG. 1, it is also significant that each of the batteries and battery support assemblies are mounted on a respective side frame assembly and, thus, becomes an integral part of a self-contained side unit connected together only by the foldable links and flexible seat panels. Thus, the wheelchair constructed according to the present invention and including the battery support assembly of this invention can be quickly and easily folded without removing or disconnecting the batteries. Also, wheelchairs of different widths can be constructed using the same types of side frame assemblies merely by selecting appropriate foldable links and seat panels and without making any special design accommodations for the battery support tray or any other mechanism.

The battery support assembly of the present invention also functions as a convenient carrier since the main strap 90 can be used as a form of handle when the support assembly 82 is disconnected from the frame.

It should be understood that the battery support assembly 84 according to the present invention can be manufactured from any number of materials such as sheet metal or molded plastic and could be provided with strap assemblies of generally tubular configuration similar to the tubular frame construction of the rest of the wheelchair. It should also be appreciated that the present invention could be utilized with any number of different types of wheelchairs provided with alternative wheel arrangements and frame designs, provided that sufficient side frame space is available for receiving the battery support assembly.

In addition, the battery support assemblies of the present invention may be completely enclosed within a box-like molded or fabricated housing 130 (FIG. 3) preferably made of a suitable plastic material and having a removable lid 132. Housing 130 and lid 132 serve to confine inadvertent spillage or leaking of battery electrolyte and to isolate the battery terminals from direct contact. The housing and lid also render the appearance of the wheelchair more pleasing.

Inasmuch as the present invention is subject to many variations, modifications, and changes in detail, it is intended that all matter contained in the foregoing description or shown in the accompanying drawing shall be interpreted as illustrative and not in a limiting sense.

What is claimed is:

1. In a wheelchair having first and second side frame assemblies connected by foldable links, a set of wheels mounted on said side frame assemblies, drive means coupled to said wheels, and a battery assembly connected to said drive means, the improvement wherein said battery assembly comprises:

a flat, generally rectangular support tray having upwardly directed peripheral sides for receiving a battery;

a rigid carrier strap attached to said support tray;

first mounting means on said support tray for attaching said tray to a generally horizontal frame member of one of the side frame assemblies of the wheelchair; and second mounting means on the rigid carrier strap for attaching said strap to another generally horizontal frame member in superposition with said first generally horizontal frame member on said one side frame assembly, whereby a battery may be carried solely on said one side frame assembly thereby to enable folding of said wheelchair.

2. The battery assembly as recited in claim 1 comprising two of said support trays for attachment one on each of said first and second side frame assemblies to support two batteries.

3. The battery assembly as recited in claim 1 wherein said first mounting means comprises a first mounting block for rigid attachment to a wheelchair frame member and a first connecting link extending between said first mounting block and said support tray; and wherein said second mounting means comprises a second mounting block for rigid attachment to a wheelchair frame member and a second connecting link extending between said second mounting block and said carrier strap.

4. The battery assembly as recited in claim 3 wherein said first and second connecting links are coaxially aligned.

5. The battery assembly as recited in claim 4 wherein said first and second mounting blocks extend downwardly and upwardly, respectively, for attachment to generally horizontal, spaced frame members of one of said side frame assemblies, whereby said battery assembly may be nested in the space between said frame members.

6. The battery assembly as recited in claim 1 wherein said carrier strap is in the form of an inverted, generally U-shaped member having a generally flat elongated main strap portion aligned longitudinally with respect to said support tray and lying in a plane in superposition of and parallel to the plane of said support tray, and a pair of generally flat leg portions connecting the ends of said main strap portion to respective opposite sides of said tray.

7. The battery assembly as recited in claim 6 further including a generally U-shaped wall strap having a back strap portion connected at each end by a respective one of a pair of arms to an intermediate point of the leg portions, respectively, of said carrier strap.

8. The battery assembly as recited in claim 7 wherein each of said legs of said carrier strap and each of said arms of said wall strap lie in respective parallel planes perpendicular to the planes of said tray and said main strap portion of said carrier strap; and wherein said back strap portion os said wall strap lies in a plane perpendicular to said planes of said tray, said main strap portion, said legs, and said arms.

9. The battery assembly as recited in claim 7 wherein said generally U-shaped wall strap comprises a flat, elongated length of material bent 90° at two spaced points to define the junction points between the ends of said back strap portion and each of said pair of arms.

10. The battery assembly as recited in claim 7 wherein said generally U-shaped carrier strap comprises a flat, elongated length of material bent 90° at two spaced points to define the junction points between the ends of said main strap portion and each of said pair of legs.

11. The battery assembly as recited in claim 1 further including a cover surrounding said support tray and said carrier strap, said cover comprising a housing and a lid removably attached to said housing.

12. An electrically driven wheelchair, comprising: a foldable frame supported on two pairs of wheels each rear wheel being independently driven by electric driving means comprising an electric motor; battery power means connected to said electric motor; a carrier for said battery power means removably supported on said frame; control means operatively connected to each of said electric motors and said battery power means; drive transmitting means coupling each of said electric motors to its associated rear wheel; said foldable frame comprising two main frame assemblies; and said carrier for said battery power means comprising a flat, generally rectangular support tray having upwardly directed peripheral sides for receiving said battery power means, a rigid carrier strap attached to said support tray, first mounting means on said support tray for attaching said tray to a frame member of one of said main frame assemblies, and second mounting means on said carrier strap for attaching said strap to a different frame member of said one main frame assembly, whereby said wheelchair may be folded without removing said battery power means.

* * * * *